Dec. 10, 1968     J. D. VAN BENTHUYSEN ET AL     3,416,119
VARIABLE RESISTANCE CONTROL WITH CLUTCH MECHANISM
Filed April 20, 1966

INVENTORS
JOHN D. VAN BENTHUYSEN
DONALD L. KLEYKAMP
BY John J. Gaydos
ATTORNEY

United States Patent Office 3,416,119
Patented Dec. 10, 1968

3,416,119
VARIABLE RESISTANCE CONTROL WITH CLUTCH MECHANISM
John D. Van Benthuysen, Elkhart, Ind., and Donald L. Kleykamp, Portage, Mich., assignors to CTS Corporation, Elkhart, Ind., a corporation of Indiana
Filed Apr. 20, 1966, Ser. No. 543,939
11 Claims. (Cl. 338—174)

ABSTRACT OF THE DISCLOSURE

Lead screw type variable resistance control having a slip clutch mechanism to prevent overdriving of a contact relative to a resistance element. Clutching action is obtained by using a driven member having a rim movable in a radial direction away from a driving member. Clutching action occurs when the driven member has reached its limits of travel.

---

Figure 1:
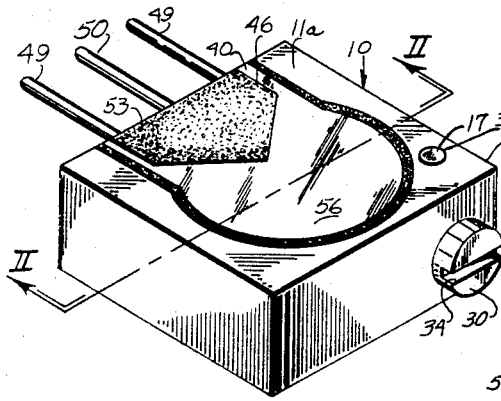

The present invention relates to variable resistance controls, and, more particularly, to a slip-clutch mechanism for a variable resistance control of the lead screw type.

Variable resistance controls are generally provided with a stop mechanism to limit or halt travel of a movable contact beyond predetermined limits normally near the ends of a resistance element. A lead screw operably engages a gear secured to the contact and is rotated by an operator to move the contact. Since the disposition of the movable contact with respect to the resistance element is not visible to the operator of the control, continued rotation of the lead screw, after the stop mechanism halts rotation of the contact, results in damage to the gear such as stripping of teeth therefrom. If a stop mechanism is not provided in the variable resistance control, travel of the movable contact across the ends of the resistance element results in an abrupt change in resistance at the output terminals of the control. In certain applications a sudden change in resistance is detrimental to proper performance of the electronic equipment. In an effort to avoid damage to the gear of a control, various types of clutches are currently available on the market such as the slip-clutch disclosed in Grunwald et al. Patent No. 3,242,452, dated Mar. 22, 1966, and assigned to the same assignee as the present invention. The Grunwald et al. slip-clutch utilizes a mutilated gear having a U-shaped spring affixed to the gear. As the movable contact approaches one of the ends of the resistance element, the legs of the U-shaped spring engage the lead screw. Further movement of the gear is eventually halted by a stop mechanism and continued rotation of the lead screw causes the legs of the U-shaped spring to flex over the crests of the lead screw. Although such slip-clutches are satisfactory, it would be desirable to reduce the number of parts as well as the assembly cost of a slip-clutch in a variable resistance control.

Accordingly, it is an object of the present invention to provide a variable resistance control with an improved slip-clutch. An additional object of the present invention is to provide clutch means for a variable resistance control wherein a driven member is provided with a radially flexible rim segment to effect a slipping action between a driving member and the driven member. Another object of the present invention is to provide a clutch mechanism for a variable resistance control by making the driven gear of resilient material and providing a notch in the web portion of the gear to permit flexing of the gear segment adjacent to the slot. A further object of the present invention is to provide a gear for a variable resistance control wherein the portion of the gear engaging the thread of a lead screw flexes radially inwardly when rotation of the gear is arrested and rotation of the lead screw continued. A still further object of the present invention is to provide a variable resistance control with a rotatable gear having an arcuate slot in one side thereof, the ends of the arcuate slot defining a stop member, and a stop arm disposed in the control extending into the slot for limiting rotation of the gear. Yet another object of the present invention is to provide a variable resistance control with a molded gear having a pair of spaced supporting pins integral with the gear and a contactor having a pair of apertures secured to the gear with the pins passing through the apertures. Further objects and advantages of the present invention will become apparent as the following description proceeds, and the features of novelty characterizing the invention will be pointed out with particularity in the claims annexed to and forming a part of this specification.

Briefly, the present invention is concerned with a variable resistance control comprising a housing provided with a chamber having a driven member rotatably mounted therein engaging a driving member rotatable externally of the housing. A resistance element is mounted in the housing and a contact is constrained to rotate with the driven member for wipingly engaging the resistance element. Rotation of the driving member drives the driven member and moves the contact intermediate the ends of the resistance element. When the contact reaches one of the ends of the resistance element, rotation of the driven member is halted by a stop arm engaging a stop member carried by the driven member. The driven member is provided with a radially flexible rim segment operably engaging the driving member when rotation of the driven member is arrested. Further rotation of the driving member causes a clutching action between the driving member and the driven member as the rim of the driven member flexes radially inwardly. In one form of the invention, the driven member is a gear, and an arcuate notch is provided in the gear adjacent to the flexible rim segment.

Figure 2:
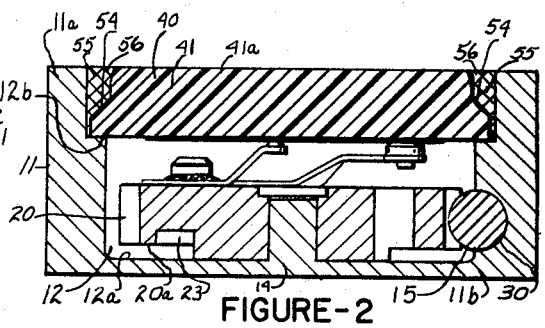
Figure 3:
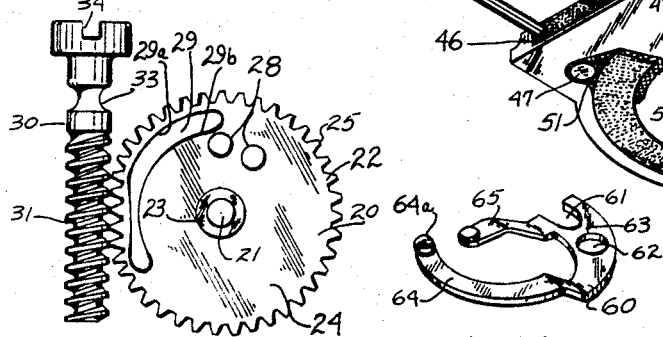
Figure 5:
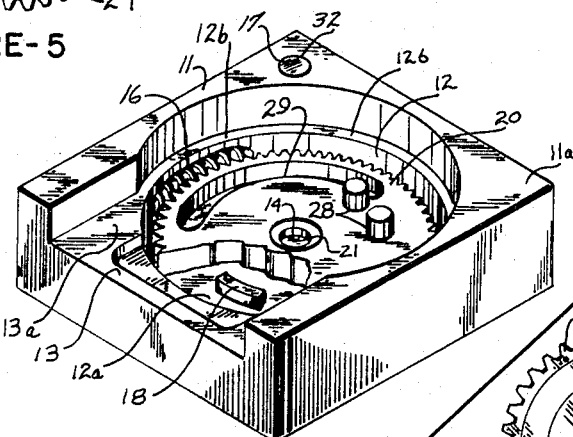
Figure 4:
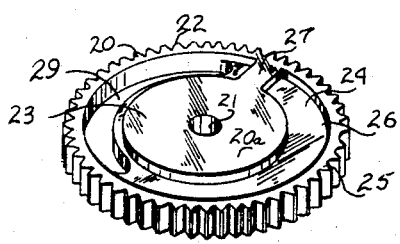
Figure 6:
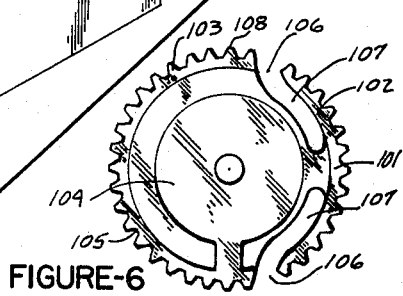

For a better understanding of the present invention, reference may be had to the accompanying drawings wherein the same reference numerals have been applied to like parts and wherein: FIGURE 1 is an isometric view of a variable resistance control built in accord with the present invention; FIGURE 2 is a sectional view taken along line II—II of FIGURE 1; FIGURE 3 is an exploded view of the control shown in FIGURE 1; FIGURE 4 is an isometric view showing the bottom face of the gear employed in the variable resistance control of the present invention; FIGURE 5 is a top plan view of the lead screw and gear shown in FIGURE 3 of the drawings after rotation of the gear is arrested and rotation of the lead screw is continued; and FIGURE 6 is a bottom plan view showing another embodiment of a gear.

Referring now to the drawings, there is illustrated a variable resistance control, generally indicated at 10, comprising a housing 11, a driven member 20 rotatably mounted in the housing, a lead screw 30 drivingly engaged with the driven member, a resistance element 40 and a contactor 60 constrained to rotate with the driven member for wipingly engaging the resistance element 40.

Considering first the housing 11, it comprises a single, rectangular molded member of suitable molding material such as diallyl phthalate resin having a centrally located cylindrical chamber 12 open at one end. Other materials such as die-cast aluminum may also be employed for molding the housing. The front and rear faces 11a and 11b of the housing 11 are generally parallel to each other to facilitate stacking of the controls. The operating members such as the driven member 20 and the contactor 60 are disposed in the chamber 12. When the control 10 is mounted sideways, it is necessary that the housing be provided with a rectangular passageway or cavity 13 (see FIGURE 3) communicating with the cylindrical chamber 12 and with one side of the housing 11.

For the purpose of rotatably supporting the driven member 20 in the chamber of the housing 11 and, as shown in FIGURES 2 and 3 of the drawings, a centrally located spindle 14 extends upwardly from the bottom wall 12a of the chamber 12 into a centrally located aperture 21 provided in the driven member. The housing is also provided with an elongated bore 15 (see FIGURE 2) rotatably supporting the driving member 30 preferably, as shown in the drawings, a lead screw. The bore 15 communicates with one side of the housing 11 and has its axis normal to the rotatable axis of the driven member 20. A portion of the elongated bore 15 passes through the space occupied by the cylindrical chamber 12 forming an opening 16 between the chamber 12 and the bore 15. The opening 16 provides sufficient space in the housing to allow the driven member 20 to engage with the driving member 30, e.g., the lead screw. The lead screw is conveniently retained in the housing 11 by a pin 32 engaging an annular groove 33 formed on the lead screw. The pin 32 is retained in a cavity 17 extending normal to the elongated bore 15 and located with the edges of the annular groove 33 being within the cavity 17. Preferably the pin 32 of electrically nonconductive material such as nylon and pressed into the cavity 17 frictionally loads the lead screw 30 to prevent inadvertent rotation of the lead screw when the control 10 is subjected to vibration or shock. A slot 34 formed at one end of the lead screw may be employed for rotating the lead screw externally of the control.

The driven member 20 is formed of a resilient dielectric material such as glass-filled nylon or polyfluorodichloroethylene which is readily molded or punched and can be flexed without taking a set. If it is desirable to make the driven member 20 of metal, then the driving member is preferably of a dielectric material to insulate the operator from electrical shock. The driven member 20 comprises a rim 22 connected to a hub 23 by means of a web 24. Preferably the driven member 20, as shown in the drawings, is a gear having a plurality of teeth 25 formed on the periphery of the rim 22. The bottom side 20a (see FIGURE 4) of the gear is provided with an arcuate slot 26, the arc or angle defined by the slot determining the angular rotation of the gear. A stop arm 18 (see FIGURE 3) extending upwardly from the bottom wall 12a of the chamber 12 into the arcuate slot 26 limits angular rotation of the gear 20 as the stop arm 18 abuts against one of the ends of the arcuate slot 26, the ends of the arcuate slot 26 forming a stop member 27.

As shown in the drawings, the resistance element 40 is mounted in the open end of the cylindrical chamber 12 and rests upon a circumferential ledge 12b provided in the cylindrical chamber 12. The top of the ledge 12b is flush with the bottom surface 13a of the rectangular cavity 13. The resistance element 40 comprises a ceramic substrate 41 of alumina or steatite defined by a flat circular section 42 and a flat rectangular section 43 integral with the circular section, the flat surfaces 42a and 43a lying in the same plane and facing the inside of the cylindrical chamber 12. A cermet resistance film 44 deposited onto the flat surface 42a of the circular section is fired at temperatures in excess of 600° F. to fuse the resistance film to the flat surface. Other types of resistance elements such as a carbon or a wirewound resistance element can be disposed in the housing 11 instead of the resistance element 40. A center collector 45 also deposited on the flat surface 42a within the path defined by the resistance film 44 is air-dried or fired to bond the collector to the flat surface. The top or outer surface 41a of the substrate is provided with a recessed section 46, and a plurality of apertures 47 and 48 (see FIGURE 3) communicating with the recessed section 46 pass through the substrate 41 adjacent to the ends of the resistance film 44 and the collector 45 respectively. Suitable L-shaped lead wires 49 and 50 are mounted in the recessed section 46 with the ends of the lead wires extending into the apertures 47 and 48 provided in the substrate. Conductive pads 51 and 52 surrounding the apertures 47 and 48 are deposited in overlapping relationship with the ends of the resistance film 44 and the center collector 45. A suitable conductive epoxy fixedly secures and electrically connects the lead wires 49 and 50 to the conductive pads 51 and 52. A dielectric epoxy 53 disposed in the recessed section 46 secures the lead wires to the substrate 41. A peripheral chamfer 54 extending around the substrate 41 cooperates with an inner wall of the housing 11 forming a groove 55 (see FIGURE 2) filled with an adhesive 56 securing the substrate to the housing 11.

For the purpose of mounting the contactor 60 on the gear 20 and constraining the contactor 60 to rotate therewith, the gear is provided with a pair of upwardly extending contactor supporting pins 28 extending into a pair of openings 61 and 62 provided in the contactor. The width of the section 63 between the openings 61 and 62 of the contactor is slightly greater than the distance between the supporting pins 28 to assure that the section 63 is tightly wedged between the pins to maintain the contactor secured to the gear 20. Preferably the ends of the contactor supporting pins are heat swaged to improve the securing means between the gear and the contactor 60. The contactor comprises a pair of contact arms 64 and 65 for wipingly engaging the resistance film 44 and the center collector 45 respectively.

During operation of the control, it is preferable to provide clutching means for halting rotation of the contactor 60 as the contact 64a carried by the contact arm 64 approaches the end of the resistance film and rotation of the lead screw 30 is continued. To this end, the web 24 of the gear 20 is provided with an arcuate notch 29 extending transversely of the gear. Two sides 29a and 29b of the notch 29 are preferably concentric with the rotational axis of the gear 20. In a preferred form of the invention, and as best shown in FIGURE 4 of the drawings, the arcuate notch 29 communicates with the arcuate slot 26 provided in the bottom side of the gear. The relationship between the stop arm 18, the stop member 27, and the arcuate notch 29 is such that, as the stop member 27 abuts against the stop arm, the arcuate notch 29 is disposed between the lead screw and the hub 23 of the gear as shown in FIGURE 3. Further rotation of the lead screw 30 in the same direction flexes a segment of the rim 22 of the gear made more flexible by the notch 29 moving the segment inwardly as shown in FIGURE 5 until the teeth engaging the thread of the lead screw can snap over the crests of the lead screw. It is to be understood that the arcuate notch need not extend completely through the web 24 of the gear so long as the segment of the rim flexes sufficiently radially to provide a slip-clutch action between the lead screw 30 and the gear 20 when the contact constrained to rotate with the gear reaches one of the ends of the resistance film.

In a device built in accord with the present invention, the housing had the dimensions of .51 x .51 x .23, the diameter of the gear measured .360 inch, the width of the arcuate notch measured .030 inch and the arcuate notch subtended an arc of 130°. The distance between the crest and the root of the teeth measured .015 inch therefore as rotation of the gear was arrested, continued rotation of the lead screw flexed the segment of the rim adjacent to the arcuate notch inwardly approximately .015 inch before the teeth of the gear flexed over the crests of the lead screw. The gear also was provided with a stop member having a width of .040 inch and the arcuate slot was recessed into the web from the bottom surface .015 inch.

In another embodiment, the center 101 of a segment 102 of the rim 103 is connected to the hub 104 of a gear 105 as shown in FIGURE 6. The widths 106 of the notches 107 at the periphery of the gear are at a minimum to permit continuous engagement of the gear teeth 108 with a lead screw as a contact carried by the gear is wiped between the ends of resistance film.

While there has been illustrated and described what is at present considered to be a preferred embodiment of the present invention, and an additional embodiment thereof, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. In a clutch mechanism adapted for preventing relative movement between contact means and resistance element means of a variable resistance control beyond a predetermined point the combination comprising a driven member in fixed relationship with one of said means and in driving relationship with the other of said means, and a driving member operably engaging the driven member, said driven member having a rim integral with the driven member, a segment of the rim flexing radially to disengage the driven member from the driving member.

2. The clutch mechanism of claim 1, wherein the driven member comprises a hub centrally disposed within the rim, and a web secures the hub to the rim, the web being provided with a notch adjacent to the segment of the rim adapted to flex radially.

3. The clutch mechanism of claim 1, wherein the rim is provided with a pair of notches extending toward each other dividing the rim into two segments, one of said segments being hingedly secured to the other of said segments intermediate the ends thereof by a web section whereby upon halting rotation of the driven member continued rotation of the driving member flexes a portion of one of the segments radially inwardly to disengage the driving member from the driven member.

4. The clutch mechanism of claim 2, wherein the driven member is a gear having a plurality of teeth on the rim thereof, and the driving member is a lead screw operably engaging the gear whereby upon arresting rotation of the gear, continued rotation of the lead screw moves the segment of the rim radially inwardly shifting the teeth over the crests of the lead screw.

5. The clutch mechanism of claim 2, wherein the notch is defined by a pair of side walls concentric with the rotational axis of the driven member.

6. The clutch mechanism of claim 2, wherein the notch extends through the web of the driven member.

7. The mechanism of claim 4, wherein the web on one side of the gear is recessed to provide an arcuate slot, the ends of the arcuate slot being spaced from each other to define a stop member, and a stop arm disposed in the control extends into the arcuate slot provided in the gear for limiting rotation thereof.

8. The variable resistance control of claim 4, wherein a pair of spaced contactor supporting pins extend outwardly from one side of the gear, and a contactor provided with a pair of spaced apertures is supported by the gear, the contactor supporting pins passing through the apertures and having swaged end portions to constrain the contactor to rotate with the gear.

9. In a clutch mechanism adapted for preventing relative movement between contact means and resistance element means of a variable resistance control beyond a predetermined point, the combination comprising a driven member in fixed relationship with one of said means and in driving relationship with the other of said means, and a driving member operably engaging the driven member, said driven member having a one-piece differentially resilient rim whereby upon arresting rotation of the driven member, continued rotation of the driving member moves a segment of the rim radially to disengage the driven member from the driving member.

10. In a variable resistance control, the combination of a resistance element, a contact for wipingly engaging the resistance element, a gear of electrically nonconductive material operably driving the contact between two points, a lead screw engaging the gear, said gear comprising a rim, a hub centrally disposed of the rim and a web connecting the rim to the hub, and a plurality of teeth formed on the rim, a portion of the rim being more resilient than the remainder of the rim, whereby upon arresting rotation of the gear, continued rotation of the lead screw moves the portion of the rim radially inwardly shifting the teeth over the crests of the lead screw.

11. The variable resistance control of claim 10, wherein the web is provided with an arcuate notch equidistant from the rotational axis of the gear weakening a portion of the rim to enable said portion to flex radially inwardly when rotation of the gear is arrested and rotation of the lead screw is continued, the web being provided with an arcuate slot on the side opposite the side containing the arcuate notch, the ends of the arcuate slot being spaced from each other to define a stop member, and a stop arm disposed in the control extends into the arcuate slot provided in the gear for limiting rotation thereof.

References Cited

UNITED STATES PATENTS

| 3,105,217 | 9/1963 | Ferrell et al. | 338—174 |
| 3,115,614 | 12/1963 | Habereder | 338—174 |
| 3,242,452 | 3/1966 | Grunwald et al. | 338—174 |

FOREIGN PATENTS 903,254  8/1962  Great Britain.

ROBERT K. SCHAEFER, *Primary Examiner.*

H. J. HOHAUSER, *Assistant Examiner.*

U.S. Cl. X.R.

435—425